United States Patent [19]

Badagnani et al.

[11] 4,051,326

[45] Sept. 27, 1977

[54] ARRANGEMENT FOR THE REMOTE SWITCHING-ON AND INITIALIZATION OF A DATA TERMINAL

[75] Inventors: Guido Badagnani, Fiorano; Giancarlo Carioli, Banchette, both of Italy

[73] Assignee: Ing. C. Olivetti & C., S.p.A., Ivrea (Turin), Italy

[21] Appl. No.: 715,127

[22] Filed: Aug. 17, 1976

[30] Foreign Application Priority Data

Sept. 30, 1975 Italy .................................. 69411/75

[51] Int. Cl.² ......................................... H04M 11/00
[52] U.S. Cl. .............................. 179/2 DP; 179/2 A; 364/900
[58] Field of Search ........................... 179/2 A, 2 DP

[56] References Cited

U.S. PATENT DOCUMENTS

| | | | |
|---|---|---|---|
| 3,470,538 | 9/1969 | Harbaugh | 445/1 |
| 3,472,965 | 10/1969 | Blossom | 179/2 DP |
| 3,723,656 | 3/1973 | Curtis et al. | 179/2 A |
| 3,908,086 | 9/1975 | Marino et al. | 179/2 DP |

*Primary Examiner*—George G. Stellar

[57] ABSTRACT

The function of the arrangement consists in connecting the terminal to the supply system (switching-on) and in loading therein the programs required for its operation (initialization) in the absence of the operator. A call signal (RING) sent by the remote computer produces the switching-on and initialization of the terminal. When the initialization has been completed, the terminal sends a ready-to-receive signal on the line and the conversation begins. At the end of the transfer of data, the telephone line is disconnected without the need to switch off the terminal. This is switched off after all the home processing operations (on the data received from the computer) are at an end. Finally, the terminal returns to the initial state, that is it is ready to switch on and be initialized on the arrival of the signal RING.

3 Claims, 9 Drawing Figures

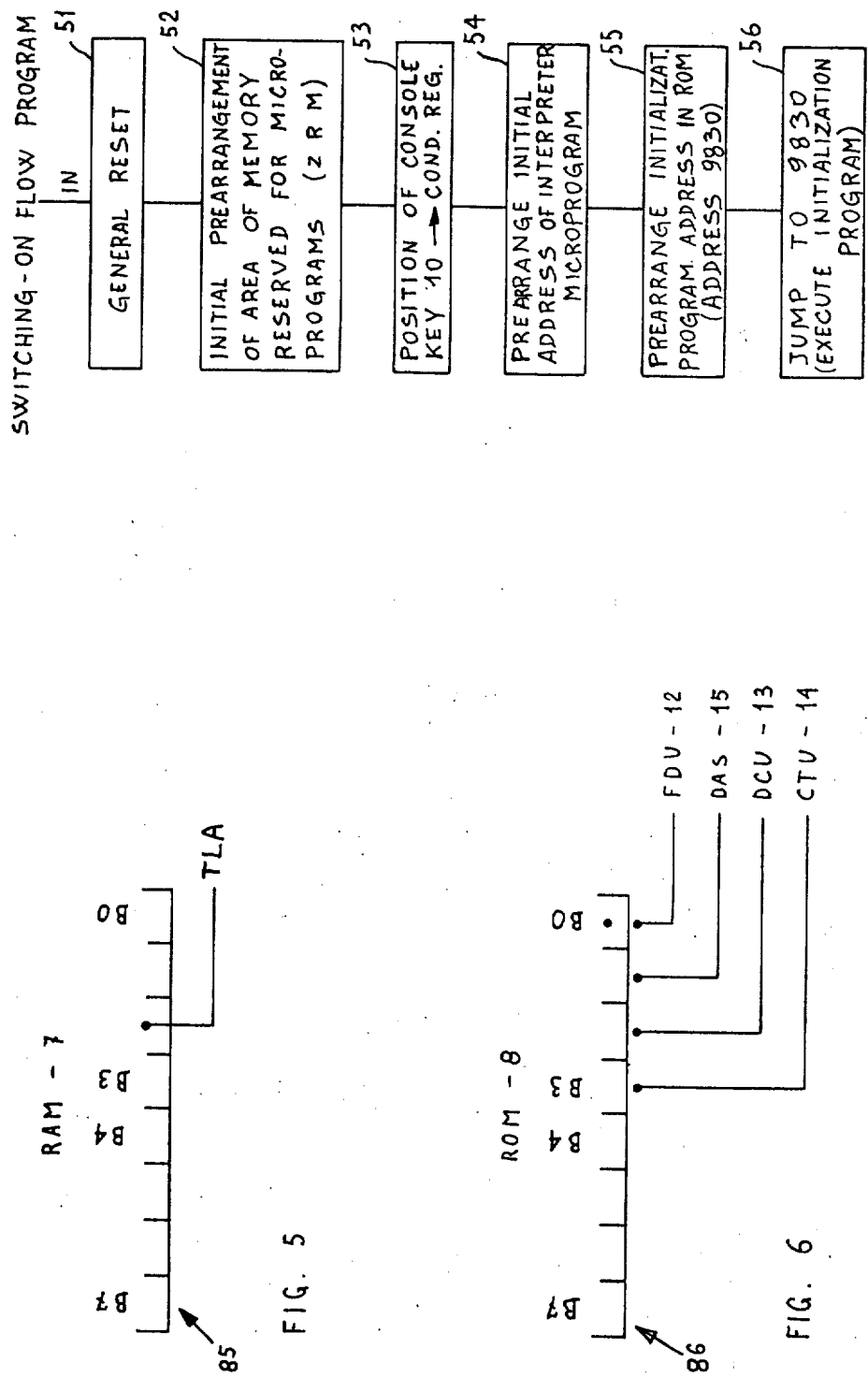

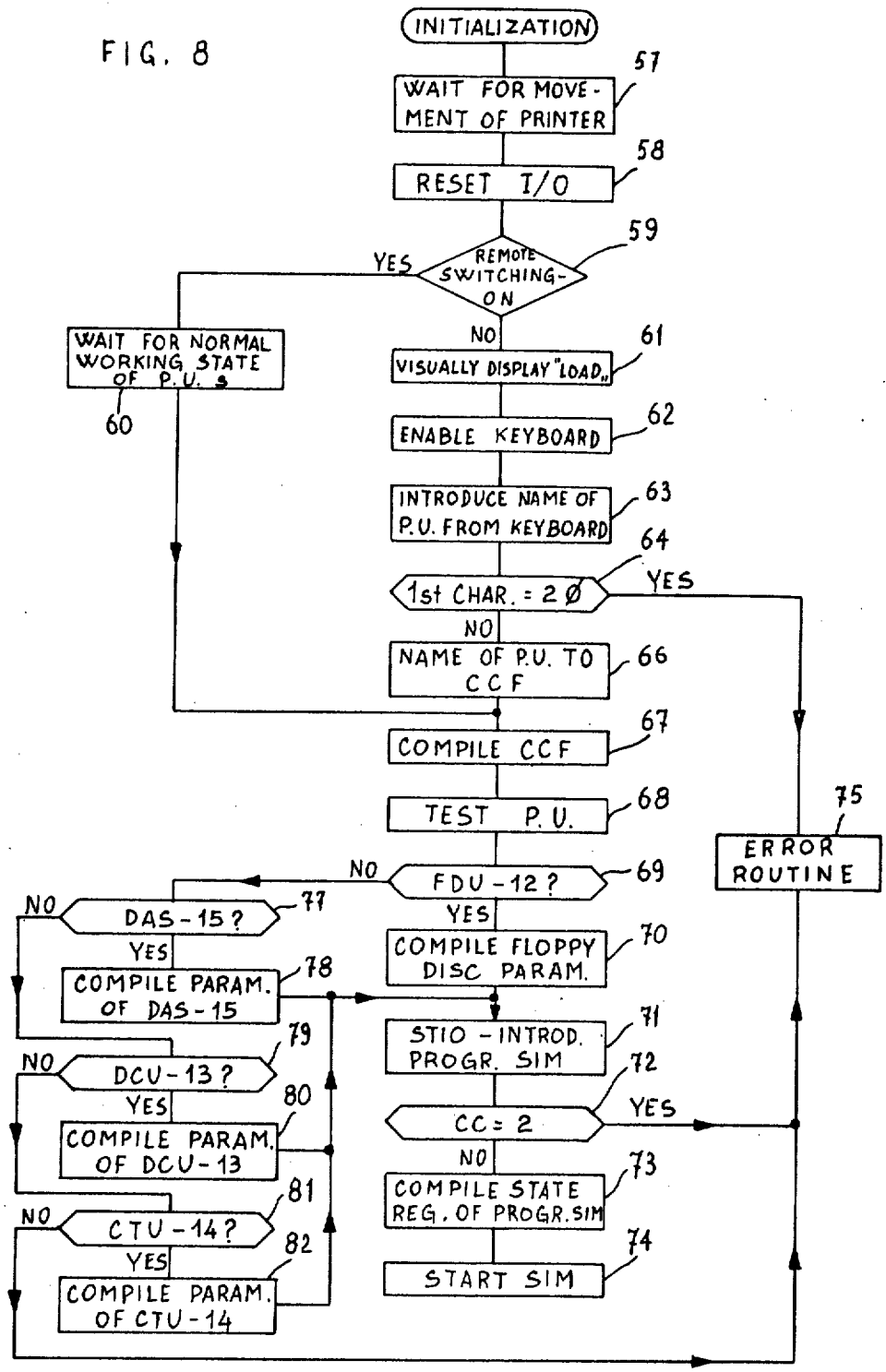

ARRANGEMENT FOR THE REMOTE SWITCHING-ON AND INITIALIZATION OF A DATA TERMINAL

BACKGROUND OF THE INVENTION

1. Field of the invention

The present invention relates to a data terminal with an arrangement for the remote switching-on and initialization of the terminal connected to a remote computer by means of a telephone line.

2. Description of the prior art

An arrangement for connecting a terminal to a computer in the absence of the operator is kmown which uses a core memory for containing the program required for connection. In this arrangement, the call signal serves solely to produce the reply of the terminal to the computer inasmuch as the central unit and the peripheral units have already been supplied and initialized previously.

The disadvantage of this arrangement consists in the loss of reliability of the system consequent upon the fact that all the electronic parts are continuously supplied throughout the period (generally at night) of the absence of the operator.

The problem therefore exists of increasing the reliability of the terminals by reducing the total number of hours during which the system is supplied.

SUMMARY OF THE INVENTION

According to the present invention there is provided a data terminal including an arrangement for switching on and initializing the terminal when connected to a telephone line capable of transferring signals from and for a remote computer, comprising a power supply unit connectable to a voltage source and adapted to supply the circuits of the data terminal and switching control unit controlled by a manually-operable switch having a position for remote switching on of the data terminal, in which position the switching conrol control is energized from the voltage source and is arranged to recognize a call signal transmitted by the remote computer on the telephone line, the switching control unit including a logical circuit which is activated by the recognition of the call signal and arranged to connect the power supply unit to the voltage source and to separate a signal activating the operations of initialization of the data terminal.

BRIEF DESCRIPTION OF THE DRAWINGS

FIGS. 5 and 6 represent the contents of two registers contained in memories of the terminal;

FIGS. 7 and 8 represent a flow diagram of the operations performed by the firmware in the initialization stage.

GENERAL DESCRIPTION OF THE INVENTION

Figure 1:
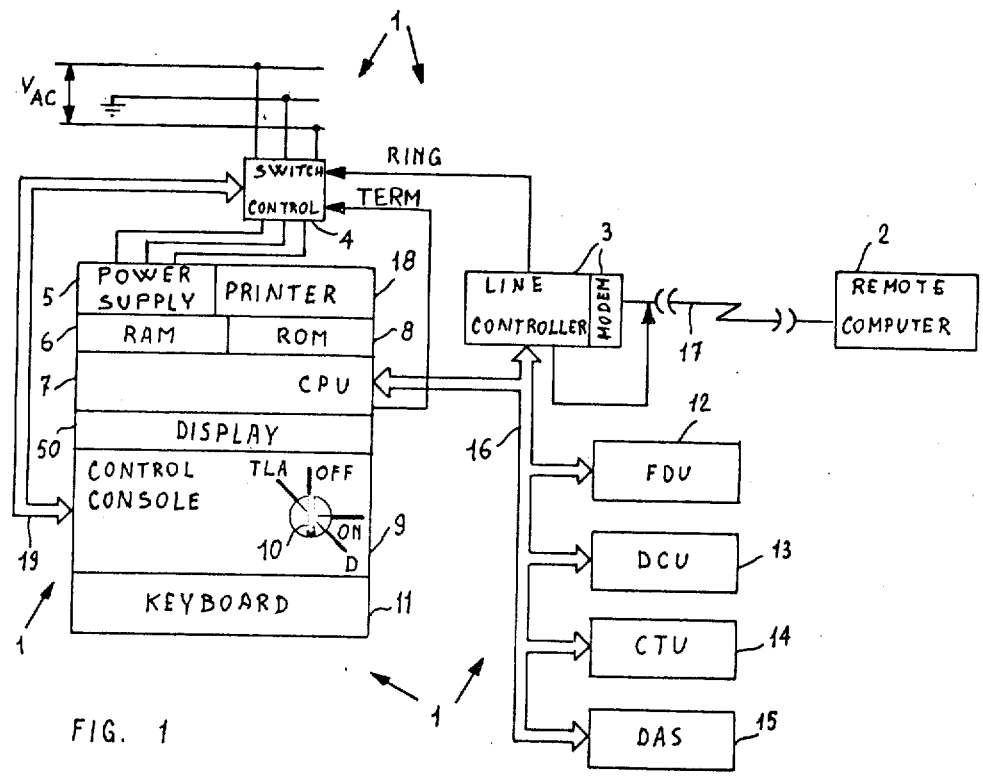
FIG. 1 is a block diagram of a terminal using an arrangement embodying the invention.

The operation of the terminal 1 in the absence of the operator will be described with reference to FIG. 1. The terminal 1 includes a central unit CPU-7 capable of executing all the arithmetical and logical operations required by the instructions contained in a read/write memory RAM-6 on the data also stored in the memory RAM-6. A read-only memory ROM-8 contains the microprograms required for commanding the circuits of the central unit CPU-7 and executing the instructions contained in the memory RAM - 6.

A control console 9 contains the control means required by the operator and, in particular, a switching-on key 10 which has ON and OFF positions and, in a position TLA, enables the machine to be prearranged for remote switching-on from the telephone line. The console 9 is connected to a switch control unit 4 via a channel 19. The unit 4 serves to switch the terminal on by connecting a power supply unkit 5 to the mains $V_{AC}$.

A printer 18, a display 50 and a keyboard 11, together with the abovementioned devices, complete the basic structure of the terminal 1. The terminal 1 is connected to a remote computer 2 through a telephone line 17 and a line controller 3 which includes a modem. Peripheral units 12 to 15 constitute the possible magnetic-support units which can be connected to the terminal.

These are:

a floppy disc unit FDU-12, a magnetic cassette unit CTU-14 and a fixed disc unit DAS-15.

The line controller 3 and the peripheral units 12 to 15 are connected to the central unit 7 through a channel 16.

The operation of the units constituting the terminal 1 is not described in detail, since they are described in detail in our British Patent Application No. 53991/74 and corresponding to French Application No. 2,256,476 published 25.7.1975, to which reference is made. This describes a microprogrammed computer of the type used by the terminal of the present invention. The line controller 3 and the peripheral units are not described in the said patent application but are widely used in the art and are described in the specialized technical literature.

For example, in the book "Digital Storage Systems" by W. Renwick and A. J. Cole, published in 1971 by Chapman and Hall Ltd., London, chapter 4 describes the techniques of recording on magnetic supports or carriers and chapter 5 describes the selection and control circuits used. Moreover, chapters 7 and 8 refer to the thin-film memories and semiconductor memories used for the RAM-6. Finally, chapter 10 speaks of the read-only memories of the type of the ROM-8. In the book "Trasmissione dati" by E. Angeleri, published by Delfino, Milan, in 1972, paragraphs 6.4 to 6.6 explain the circuitry of the modem and of the commands which come from the line controller 3 to the modem for effecting connection with the remote computer 2. For greater detail concerning the technique of microprogramming used by the central unit CPU-7 and the line controller 3, conult chapters 2 and following of the book "Microprogramming: principle and practices" by S. S. Husson, published 1970 by Prentice-Hall Inc. This illustrates the techniques of control of the arithmetic and logic unit and of the registers constituting the CPU-7 which are achieved by means of the microinstructions recorded in the ROM-8. On the basis of the description contained in the said patent application and of the examples given in the book by Husson, any average technician is able to write the microprograms corresponding to the flow diagrams given in FIGS. 6 and 8.

In order to prepare for operation of the switch control unit 4, the operator must perform the following operations:

1. He mounts on a selected peripheral unit a magnetic support containing the programs needed by the line controller 3 for handling the conversation with the remote computer 2 and the programs for processing the data received from the remote computer 2.

2. He positions the key 10 in the remote switching-on position indicated by TLA in FIG. 1.

Figure 2:
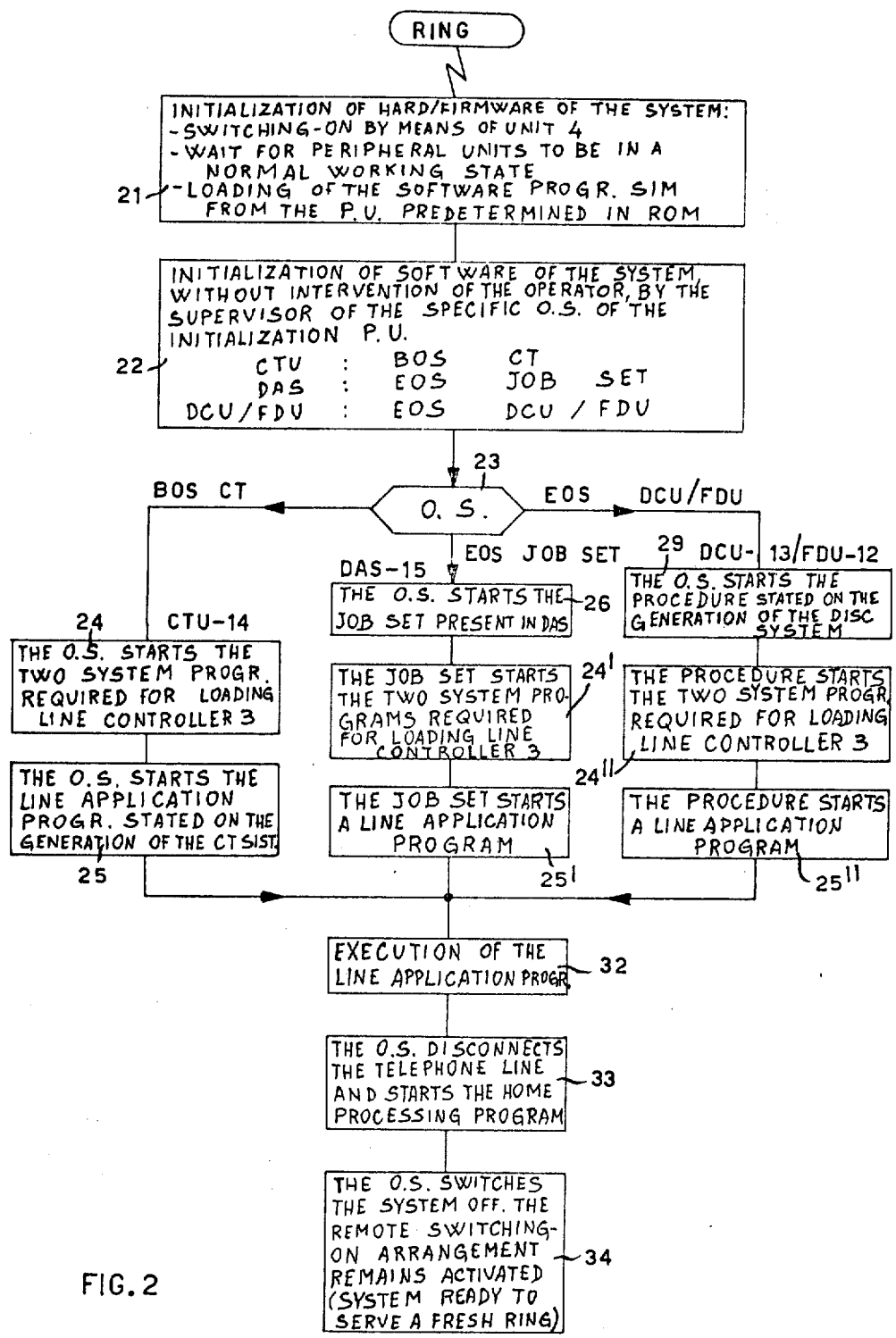
FIG. 2 is a flow diagram of the operations of switching-on and initialization of a terminal using the arrangement of FIG. 1.

When the signal RING arrives on the telephone line 17, the hardware/software system behaves in accordance with the flow diagram illustrated in FIG. 2. The block 21 commands the execution of the following operations. The signal RING is recognized by the line controller 3 and sent to the switch control unit 4, which attends to the connection of the power supply 5 to the supply system $V_{AC}$, as will be explained in detail below. Then, the firmware (flow diagrams of FIGS. 7 and 8) attends to the loading into the RAM-6 of the initializing program SIM (= system initializing module) from the peripheral unit predetermined by a register 86 (FIG. 9) contained in the ROM-8.

By means of the execution of the blocks 22 and 23, the program SIM transfers to the RAM-6 the programs of the Operative System (OS) which are required for executing the blocks 24 and 25, 24' and 25' or 24" and 25", respectively, if the initializing peripheral is the unit CTU-15, DAS-15 or DCU-13/FDU-12. More particularly, the block 24 (or 24', or 24") transfers to the line controller 3 the programs required for the conversation with the remote computer 2. The block 25 (or 25' or 25") starts the line application program. The blocks 26 and 29 are required for prearranging the loading of the program into the line controller 3 by means of the blocks 24' and 24".

The line controller 3 sends a READY signal to the remote computer 2, which is interpreted as an enabling for initiating the conversation between the terminal 1 and the computer 2. The conversation is handled by the block 32, which contains the line application program. The block 33 recognizes the end of the conversation and attends to the disconnection of the terminal 1 from the telephone line and moreover starts the application program which processes in the home system the data received from the remote computer 2. At the end of the processing operations specified by the application program, the block 34 issues the instruction for switching off the system, which causes the disconnection of the power supply 5 from the mains supply. The system returns to the remote switching-on state in which it was before reception of the call signal RING and is therefore ready to receive further calls.

Figure 3:
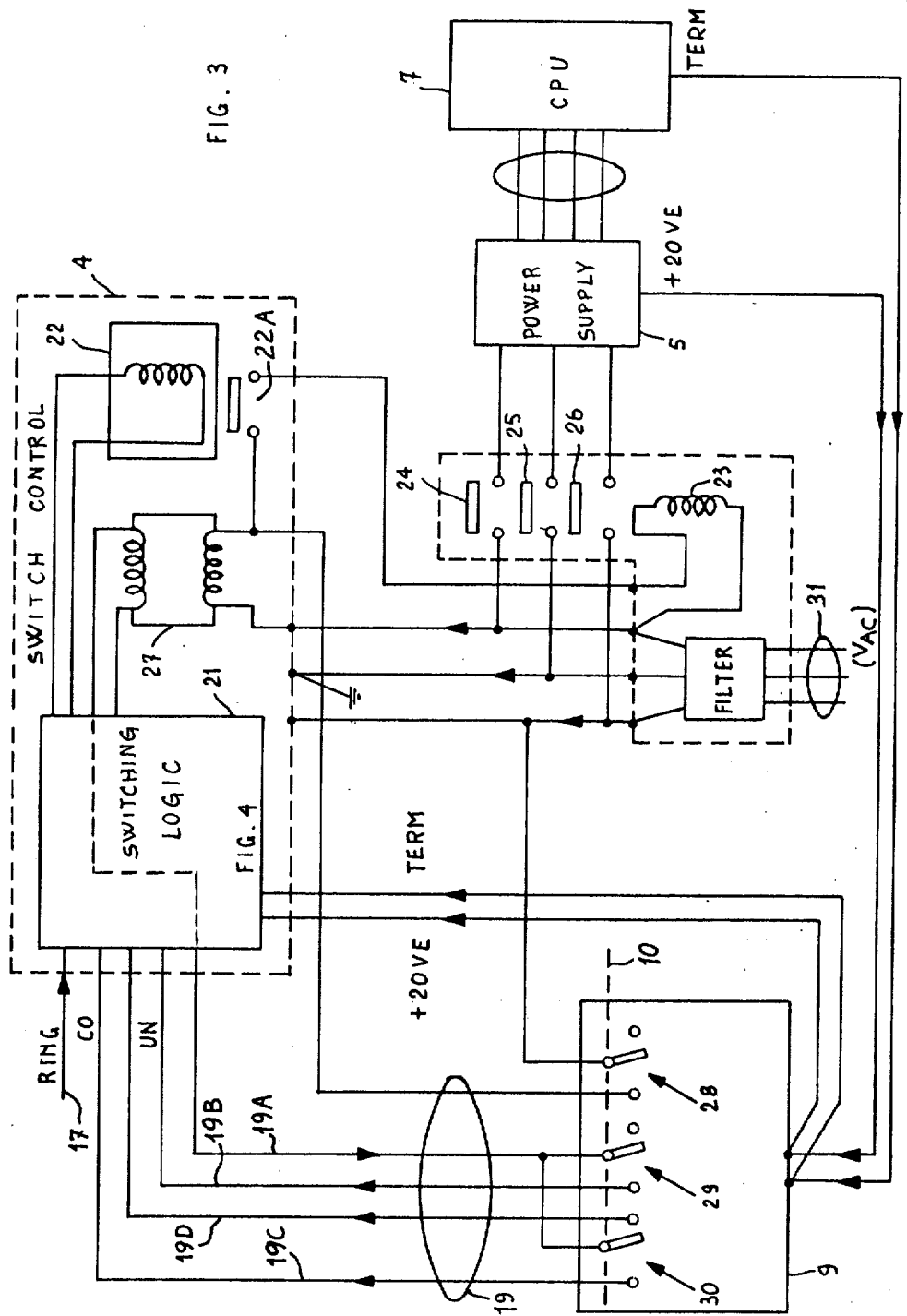
FIG. 3 shows the switching-on control unit.

The operation of the remote switching-on arrangement of the terminal 1 will now be described with reference to FIGS. 1 and 3. In all positions other than OFF, the key 10 closes a switch 28 which supplies power to a transformer 27 in the unit 4. The logical circuits 21 of the unit 4 are thereby supplied with power and the movable contacts of two further switches 29 and 31 are energised via a line 19A. In the ON position of the key the switch 29 is open and a signal UN on a line 19B is absent. To switch the terminal on the key 10 has to be moved from ON to an unstable positioned (FIG. 1), from which the key returns to ON under the action of a spring when released. In the position D the switch 30 is closed and a signal CO on line 19C is used to switch on the power supply 5 as will be described below.

In the TLA position of the key 10 the switch 29 is closed and UN is present on line 19B. In these circumstances the power supply is switched on on receipt of RING as will also be described below. In either event the power supply is switched on by energizing a pilot relay 22 to close contacts 22A, fed from the switch 28, thereby to energise a main relay 23 whose contacts 24, 25 and 26 connect the mains 31 to the power supply 5. When energised, the power supply 5 provides the d.c. voltages which are applied to the central unit CPU-7 and to all the peripherals included in the terminal 1.

The power supply 5 also emits a signal +20VE, which is sent to the unit 4 to indicate correct functioning of the power supply 5. In the event of the d.c. voltages provided by the power supply 5 not reaching the specified levels, the pilot relay 22 is deenergised and so is the main relay 23 which, in turn, removes the voltage $V_{AC}$ from the power supply 5, thus switching the terminal 1 off.

When the key 10 is ON, a fresh switching-on attempt can be made by bringing the key 10 back again to position D and releasing it into the ON position. Complete switching-off of the terminal 1 is obtained by positioning the key 10 in the OFF position.

When the key 10 is in the position TLA, the terminal 1 can be switched off by the central unit CPU-7 by the execution of a special switching-off instruction which generates a signal TERM.

Switching off by means of the signal TERM permits switching on again by means of the signal RING. The switching-off due to abnormalities of the power supply 5, that is caused by the signal +20VE, is stored by the unit 4 and blocks switching on again through the signal RING. Reactivation of the arrangement is possible only after invention by the operator, who must turn the key 10 into the OFF position and then into the position TLA again.

Figure 4:
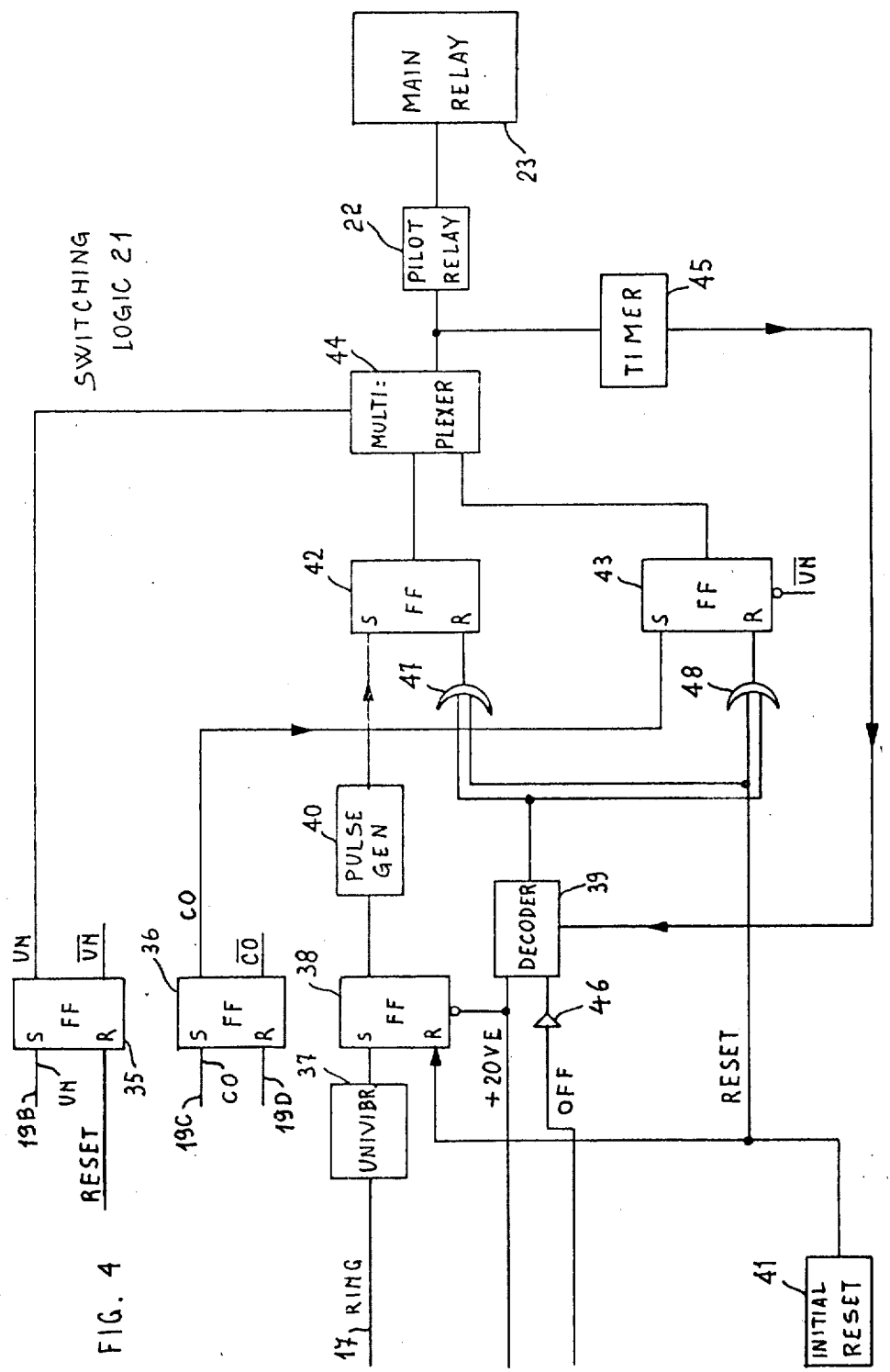
FIG. 4 is a block diagram of switching logic included in the control unit of FIG. 3.

The operation of the switching logic 21 will now be described with reference to FIG. 4. When the supply cable 31 (FIG. 3) is connected to the mains supply $V_{AC}$ and the switch 28 is closed, the transformer 27 supplies the logic 21. An initial reset device 41 is activated by the local supply derived from the transformer 27 and emits a reset signal. This signal is applied to the reset input of flip-flops 38 and 35 and, through OR circuits 47 and 48, to the reset inputs of flip-flops 42 and 43. The logic 21 is now in the waiting-for-switching-on state. At this point, the sole device of the terminal 1 which is supplied with power is the unit 21. This is ready to receive the selection made by the operator by the key 10.

If the key 10 is positioned at ON and is moved to D, the closing of the switch 30 generates the signal CO which is buffered in a flip-flop 36 which, in turn, sets the flip-flop 43. The output signal of the flip-flop 43 is applied to a first input of a multiplexer 44. The second input of the multiplexer 44 is constituted by the call signal RING coming from the telephone line through a univibrator 37, the flip-flop 38, and a pulse generator 40 and the flip-flop 42.

The selecton input of the multiplexer 44 is constituted by the signal UN coming from the switch 29 via a flip-flop 35. Since it is assumed that the key 10 is in the ON position, it follows that the switch 29 is open and therefore the flip-flop 35 is reset. The signal applied to the selection input of the multiplexer 44 is therefore at logical zero level and in this case the signal coming from the flip-flop 43 is selected and activates the output of the multiplexer 44.

The output of the multiplexer, amplified if need be, operates the pilot relay 22 and hence the main relay 23.

The output signal of the multiplexer 44 is also applied as input to a timer 45. The timer 45 performs the function of enabling a decoder 39 to check whether the d.c. voltage +20VE and the signal TERM are at the specified voltage value, that is whether TERM is at logical zero level and +20VE is at logical one level. If either condition is not met, the decoder 39 emits a pulse which resets the flip-flops 42 and 43 via the OR circuits 47 and 48.

In consequence, both the inputs of the multiplexer 44 are at logical zero level and therefore also the output changes to zero. The relays 22 and 23 are deenergised, thus switching the terminal 1 off. On the other hand, if the signals +20VE and TERM are respectively one and zero, then both the relay 22 and the relay 23 remain supplied and the terminal 1 therefore remains switched on.

If the key 10 is positioned at remote switching-on TLA, the terminal 1 prearranges itself to be switched on by the call signal RING coming from the remote computer 2 on the telephone line 17. As has been said, with the key 10 in the position TLA, the switch 29 is closed. The signal UN is applied to the set input of the flip-flop 35. The flip-flop 35 generates a signal which conditions the multiplexer 44 to select as input the signal coming from the flip-flop 42.

When the signal RING arrives on the telephone line 17, it is applied to the univibrator 37. The univibrator 37 emits a signal which sets the flip-flop 38. The output signal from the flip-flop 38 activates the pulse generator 40 which, in turn, sets the flip-flop 42. The output signal from the flip-flop 42 activates the multiplexer 44, the output of which actuates the relays 22 and 23 which, as has been seen, switch the terminal 1 on.

Even in this case, if the signal +20VE coming from the power supply 5 is not at level zero, then the flip-flop 38 is inhibited. In consequence, the flip-flop 42 is reset and the generator 40, the flip-flop 42, the multiplexer 44 and the circuit 46, relays 22 and 23 are deenergised, which disconnects the voltage $V_{AC}$ from the power supply 5, thus switching the terminal 1 off.

It is to be noted that inhibition of the flip-flop 38 by absence of the signal +20VE prevents reactivation of the switching-on arrangement on arrival of any following signal RING on the telephone line 17. It is possible to re-establish the conditions of switching-on from the telephone line only by means of intervention by the operator. The operation to be effected consists in turning the key 10 into the OFF position and back into the position TLA.

The switching-off of the terminal 1 under remote switching-on conditions takes place by means of a suitable switching-off instruction KILL from the CPU-7. The switching-off instruction KILL is executed through the medium of a microinstruction COM which generates a specific command for the console. This command corresponds to the switching-off signal TERM. When the signal TERM is at logical one level, an inverter 46 emits a signal at logical zero level. The decoder 39 then emits a signal which, via the OR circuits 47 and 48, resets the two flip-flops 42 and 43 which, as has been seen before, cause the switching-off of the terminal 1. The switching logic 21 returns to the state TLA, that is it is ready to switch the terminal 1 on when a fresh signal RING arrives. The decoder 39 is arranged so as always to be able to switch the terminal off in response to TERM whereas it can only switch the terminal off in response to +20VE at zero logical level during the period established by the timer 45.

A description of the automatic initialization stage of the terminal 1 will now be given with reference to FIGS. 5 to 8. This initialization is produced automatically by a signal RE emitted by the power supply 5 in consequence of the activation of the relay 23 in either of the ways described.

FIG. 5 shows a register 85 of the working memory RAM-6 having a capacity of eight bits and which is automatically loaded by the central unit CPU-7 during the stage of initialization of the terminal 1. The bit B2 of the register 85 of FIG. 5 is used to store the logical condition of remote switching-on associated with the position TLA of the key 10.

Figure 9:
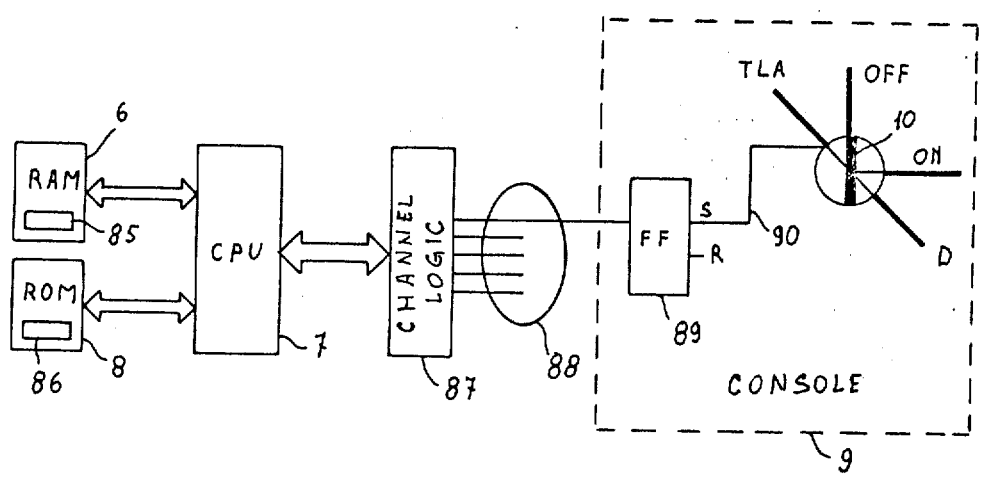
FIG. 9 is a logic diagram with the detail relating to the logic signal generated by a key in the remote switching-on position.

FIG. 9 shows the hardware required for storing the position of the key 10 in the register 85. When the key 10 is turned into tne remote switching-on position TLA, a signal is emitted on a wire 90 and sets a flip-flop 89. The output signal generated by the flip-flop 89 is transmitted to the channel logic 87 together with other specific logical console signals. Through the channel logic 87 the central unit CPU-7 periodically tests the state of the console bus 88 and writes in the register 85 of the RAM-6 the logical level associated with the conductors constituting the channel 87.

Obviously, the description of the other wires making up the channel 88 and also the operation of the channel logic 87 are omitted. For further details, reference should be made to the already mentioned Patent Application No. 53991/74 in which the operation of the channel logic 87 is explained.

The microinstruction which tests the state of the console bus 88 is represented by the functional block 53 of the flow diagram of FIG. 7. Reference will be made thereto hereinafter when the stage of switching-on of the terminal 1 is explained.

FIG. 6 shows the register 86 of the microprogram memory ROM-8 which indicates which of the peripheral units (with a magnetic support) 12 to 15 contains the programs required for operation of the terminal 1 in the absence of the operator. The register 86 is compiled by the terminal manufacturer during the writing of the memory ROM-8 and cannot be modified by the terminal owner. It therefore forms part of the hardware of the machine. The choice of the peripheral is therefore rigidly defined when the terminal is purchased. It is possible to make this solution flexible by replacing the chip of the memory ROM-8 which contains the register 86 by a PROM chip (currently available on the integrated circuit market). The PROM is a ROM programmable by means of equipment at the disposal of the assistance department of the manufacturer of the terminal 1.

As shown in FIG. 6, the bits B0 to B3 are respectively associated with the peripheral units FDU-12 (floppy disc unit); DAS-15 (fixed-disc auxiliary memory); DCU-13 (disc-cartridge unit) and CTU-14 (cartridge-magnetic tape unit).

In each terminal, only one of the bits B0 to B3 is at logical one level, while all the other are at logical zero level. The bit at logical one level indicates which of the peripherals enumerated is enabled to contain the programs and microprograms required for connection to the computer 2 in the absence of the operator.

The flow diagram of FIG. 7 relates to the microprogram recorded in the ROM-8 which is automatically executed when the main relay is closed. The first operation executed by the block 51 is the general RESET of all the parts which make up the hardware of the terminal 1. The block 52 is then executed, which prearranges a zone of the memory RAM-6 (called the ZRM) reserved for the microprograms controlling the registers and the arithmetic unit contained in the central unit CPU-7.

The block 53 tests the position of the key 10 and, if the key 10 is in the remote switching-on position TLA, puts the bit B2 of the register 85 (FIG. 5) to one. The block 54 prearranges in an address register of the ZRM the initial address of the interpreter microprogram which will be used thereafter. The block 55 prearranges in the program counter register of the central unit CPU-7 the initial address of the initialization program recorded in the ROM-8, assumed by way of example to be address 9830. Finally, the block 56 executes a jump to the initialization program of the terminal, the flow diagram of which is given in FIG. 8.

The program illustrated by FIG. 8 is also recorded permanently in the ROM-8. It begins with the block 57, which checks whether the printer is carrying out movement deriving from any signals present on the printing channel at the instant of switching-on. Then the block 58 is executed, which commands the RESET of the input/output channel. Thereafter, the logical decision 59 is carried out, which checks whether the bit B2 of the register 85 (FIGS. 5 and 9) is at logical one level.

If this bit is at logical one level, this indicates that the key 10 (FIGS. 1 and 9) is in the remote switching-on position TLA. In this case, the block 60 is executed, which conditions the central unit CPU-7 to wait for all the peripheral units connected to be in a normal working state. If, on the other hand, the bit B2 of the register 85 is at logical zero level, the block 61 relating to initialization in the presence of the operator is executed. The blocks 61 to 66 will be dealt with after explaining the remote switching-on. The block 67 is then executed, which compiles in a register of the zone ZRM called CCF a part of the control parameters relating to the transfer of data from a peripheral to the memory RAM-6.

The block 68 reads from the ROM-8 the contents of the register 86 (FIGS. 6 and 9). The logical decisions 69, 77, 79 and 81 examine the bits B0 to B3, respectively, of the register 86 to determine the peripheral unit from which the initialization program SIM must be introduced into the RAM-6. The blocks 70, 78, 80 and 82 compile in the register CCF the specific parameters of the peripheral designated by the register 86.

A jump is then made from one of the blocks 70, 78, 80 82 the block 71, which starts the input instruction, thus introducing the system initialization program (called SIM = System initialization module) into the RAM-6. The logical decision 72 checks the condition code (CC) to verify whether the input of the data has taken place without error. In the event of error (CC = 2), a jump is made to execute the error routine 75, which provides for trying the operation again several times before switching the machine off.

In the event of input without error, the block 73 is executed, which compiles the state register (PSR) of the program SIM. the block 74 starts the program SIM, which initializes the operative system (OS) of the terminal 1. This initialization consists in introducing the programs which make up the operative system and the application programs relating to connection into the RAM-6. Moreover, the central unit CPU-7 attends to the loading into the line controller 3 of the microprograms which permit handling of the conversation.

Reverting now to the diagram of FIG. 8, the blocks 61, 62, 63, 66 and the logical decision 64 are used in the event of the operator being present. In fact, if the logical decision 59 finds the bit B2 of the register 85 at logical zero level, it executes the block 61 which visually displays on the display 50 the notice "LOAD" to request the operator to specify the peripheral from which the initialization programs must be read.

The block 62 enables the keyboard and the block 63 stores in the zone ZRM of the RAM-6 the name of the peripheral unit that the operator has entered on the keyboard. The block 64 checks whether a character which is not permitted has been struck and, in the affirmative case, jumps to the error routine 75. If the peripheral entered on the keyboard is right (that is, if it is physically present in the system), then the block 66 is executed, which stores the name in the zone of the RAM-6 which is devoted to control of the input/output channel. The block 67 and the following blocks are then executed, as in the case of remote switching-on seen hereinbefore.

It is pointed out that the program represented by the flow diagram of FIG. 8 completes the hardware/firmware initialization stage represented by the block 21 of FIG. 2. More particularly, the program SIM consists of a program block with a length of 256 bytes capable of introducing and executing other programs from the peripheral unit designated by the register 86 of the RAM-6.

Therefore, in order to execute the block 22 of FIG. 2, the program SIM loads into the RAM-6 the various program blocks which constitute the operative system of the terminal 1. After loading the operative system, the application programs relating to the handling of the conversation by means of the telephone line and the controller 3 are loaded. Moreover, the application programs which process the data received from the remote computer 2 are loaded into the RAM-6. The programs loaded into the RAM-6 are immediately executed in the order fixed by the Operative System.

An example of the loading and execution of programs can be found in the patent application mentioned above, in which there is described in detail the loading of a program from a magnetic card and the immediate starting of this program. It is to be noted, moreover, that the microprogram of FIG. 7 is also similar to those described in the patent application hereinbefore mentioned. An example of application programs may be that of a program of recording on one of the magnetic supports of the peripheral units 12 to 15 of the data received from the remote computer 2, while another application program may process the data recorded on this magnetic support and then print the data by means of the printer 18.

It is desired to emphasize the fact that, in the example given, the reception of the data on the telephone line 17 can take place at the maximum speed permitted by the line itself, while the subsequent printing can be effected after the connection is finished. This operation is carried out by the block 33 of FIG. 2. In this way, it is possible to obtain a considerable saving of cost due to the minimum time used for receiving the data from the computer 2, without, however, relinquishing the possibility of processing the data received on the premises.

At the end of the execution of the application programs executed on the premises, as shown by the block 34 of FIG. 2, the terminal 1 is switched off by means of the signal TERM. As explained hereinbefore, after being switched off, the terminal 1 returns to the remote switching-on state and is therefore ready to accept a fresh signal RING from the telephone line. In consequence, with suitable application programs prearranged to accept different linkings of the component blocks, it is possible to effect a plurality of successive connections in the absence of the operator and thus increase the productivity of the terminal.

From what has been said, it is clear how the switching-on and initialization arrangement described enables a terminal to be switched on and initialized through the medium of a call signal coming from the telephone line. Moreover, all the possibilities of home working or working on the premises are available even in the absence of the operator inasmuch as the Software Operative System is capable of loading the application programs from a peripheral unit and of commanding the execution thereof.

Finally, after the home processing operations are at an end, the terminal is automatically switched off, thus reducing the hours of operation in the absence of the operator to those strictly necessary for executing the programs prearranged by the operator. This last characteristic obviously increases the reliability of the terminal.

What we claim is:

1. A terminal apparatus including an arrangement for switching on and initializing the terminal when connected to a telephone line connecting said terminal to a remote computer, comprising
   a read/write memory for storing instructions and data,
   a power supply unit connectable to a voltage source for supplying power voltage to the terminal apparatus,
   a manually operable switch actuatable for controlling the switching on of the terminal apparatus by the remote computer,
   a switch control unit,
   means responsive to the actuation of said switch for connecting said voltage source to said switch control unit,
   means included in said switch control unit for recognizing a call signal transmitted by the remote computer on the telephone line,
   a logical circuit included in said switch conrol unit and activated by said recognizing means in presence of the call signal for connecting the power supply unit to the voltage source and for generating a signal activating the initialization operations of the data terminal,
   a plurality of peripheral units connected to said terminal, at least one of said peripheral units comprising an information record for storing an initialization program for said terminal,
   a first register included in said memory for storing information relating to the actuation of said switch,
   a second register in said memory for storing information designating one of said peripheral units, and means controlled by said activating signal and by the contents of the first register for transferring to the memory the initialization program recorded in the peripheral unit designated by the second register.

2. A terminal apparatus according to claim 1, wherein said plurality of peripheral units comprises a line controller having a control memory, and wherein the initialization program transferred to the read/write memory comprises at least one operative program and one control program and said means controlled by the activating signal are adapted to transfer the conrol program to the control memory of the line controller and initiate the execution thereof.

3. A terminal apparatus according to claim 2, further comprising an arithmetic and logic unit for executing the instructions contained in the read/write memory and responsive to predetermined instruction for supplying to said logical circuit of the switching control unit a terminating signal which causes the power supply unit to be disconnected from the voltage source.

* * * * *